United States Patent [19]

Eian

[11] 4,433,024
[45] Feb. 21, 1984

[54] REDUCED-STRESS VAPOR-SORPTIVE GARMENTS

[75] Inventor: Gilbert L. Eian, White Bear Lake, Minn.

[73] Assignee: Minnesota Mining and Manufacturing Company, St. Paul, Minn.

[21] Appl. No.: 401,062

[22] Filed: Jul. 23, 1982

[51] Int. Cl.³ .............................................. B32B 27/14
[52] U.S. Cl. .................... 428/198; 428/233; 428/237; 428/244; 428/246; 428/253; 428/281; 428/282; 428/283; 428/284; 428/296; 428/298; 428/367; 428/408; 428/421; 428/903; 428/913; 428/323
[58] Field of Search .............. 428/198, 244, 246, 296, 428/284, 287, 298, 367, 408, 913, 903, 281, 282, 253, 323, 421, 237, 233, 283

[56] References Cited

U.S. PATENT DOCUMENTS

| | | | |
|---|---|---|---|
| 2,984,584 | 5/1961 | Glarum et al. | 117/76 |
| 3,586,596 | 6/1971 | Ainsworth et al. | 161/87 |
| 3,595,731 | 7/1971 | Davies et al. | 428/296 |
| 3,769,144 | 10/1973 | Economy | 161/50 |
| 3,783,085 | 1/1974 | Pearson et al. | 161/87 |
| 3,904,798 | 9/1975 | Vogt et al. | 428/244 |
| 3,932,682 | 1/1976 | Loft et al. | 428/296 |
| 3,971,373 | 7/1976 | Braun | 128/146 |
| 4,046,939 | 9/1977 | Hart | 428/311 |
| 4,103,058 | 7/1978 | Humlicek | 428/296 |
| 4,118,531 | 10/1978 | Hauser | 428/224 |
| 4,217,386 | 8/1980 | Arons et al. | 428/196 |
| 4,250,172 | 2/1981 | Mutzenberg et al. | 428/234 |

Primary Examiner—James J. Bell
Attorney, Agent, or Firm—D. M. Sell; J. A. Smith; R. R. Tamte

[57] ABSTRACT

Vapor-sorbing particle-filled sheet material having a low insulation value and useful for providing reduced-stress vapor-sorbing garments. The sheet material comprises at least one permeable support fabric attached to a fibrous web which comprises a coherent mass of melt-blown fibers and vapor-sorptive particles dispersed in the mass of fibers.

38 Claims, 2 Drawing Figures

REDUCED-STRESS VAPOR-SORPTIVE GARMENTS

BACKGROUND OF THE INVENTION

Previous proposals for garments that would protect a wearer by sorbing toxic vapors or gases have a number of deficiencies. A major deficiency is the failure to provide desired levels of vapor sorption and still maintain sufficient transfer of heat and moisture to keep a wearer cool and comfortable. For example, one previous garment lined with a carbon-loaded open-celled polymeric foam (see U.S. Pat. No. 4,046,939), allows a wearer to perform only limited activity before heat and moisture levels within the garment become intolerable.

Other deficiencies of previous vapor-sorptive garments are that binder materials used to adhere activated carbon particles in place in some garments cover part of the activated carbon particles and limit their useful life; carbonized fibers used for vapor-sorption in some garments are prohibitively expensive; and the fabric strength in some garments is limited. References describing various prior sorptive garments having these kinds of deficiencies include U.S. Pat. Nos. 3,586,596; 3,769,144; 3,783,085; 4,217,386; and 4,250,172.

SUMMARY OF THE INVENTION

The present invention provides a new fabric or sheet material useful for making garments that achieve desired levels of vapor sorption and yet apply low heat- and moisture-stress on an individual wearing the garment. This new sheet material comprises a permeable support fabric and, attached to the support fabric, a fibrous web that comprises a coherent mass of melt-blown organic polymeric fibers and vapor-sorptive particles uniformly dispersed in the mass of fibers. The fibrous web is chosen so as to contribute a low thermal insulation to the complete sheet material, and yet the mass of fibers holds a sufficient volume of particles to provide desired vapor sorption. Also, the complete sheet material is strong and durable so as to achieve the needed length of life in a garment.

DETAILED DESCRIPTION

Figure 1:
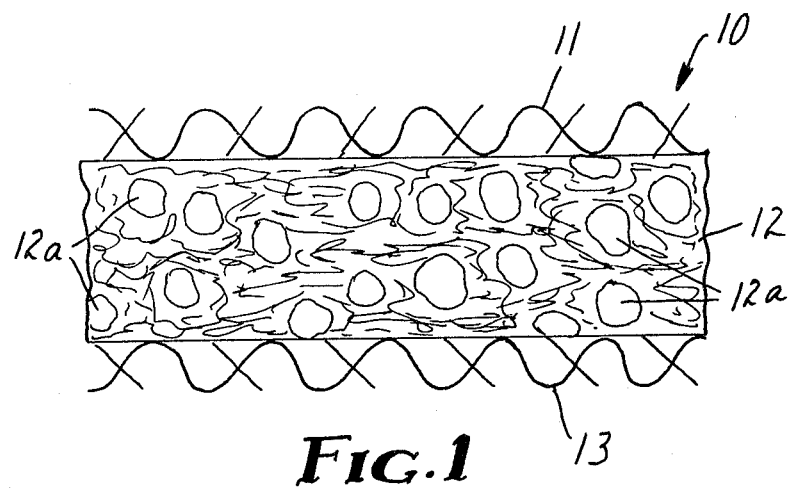
FIG. 1 is a greatly enlarged sectional view through a representative sheet material of the present invention.

A representative sheet material of the invention is pictured in FIG. 1. This sheet material 10 comprises a permeable support fabric 11 adapted to serve as the outer fabric of the sheet material, a melt-blow fiber web 12 which contains vapor-sorptive particles 12a, and a permeable support fabric 13 adapted to serve as the inner fabric or liner for a garment.

Figure 2:
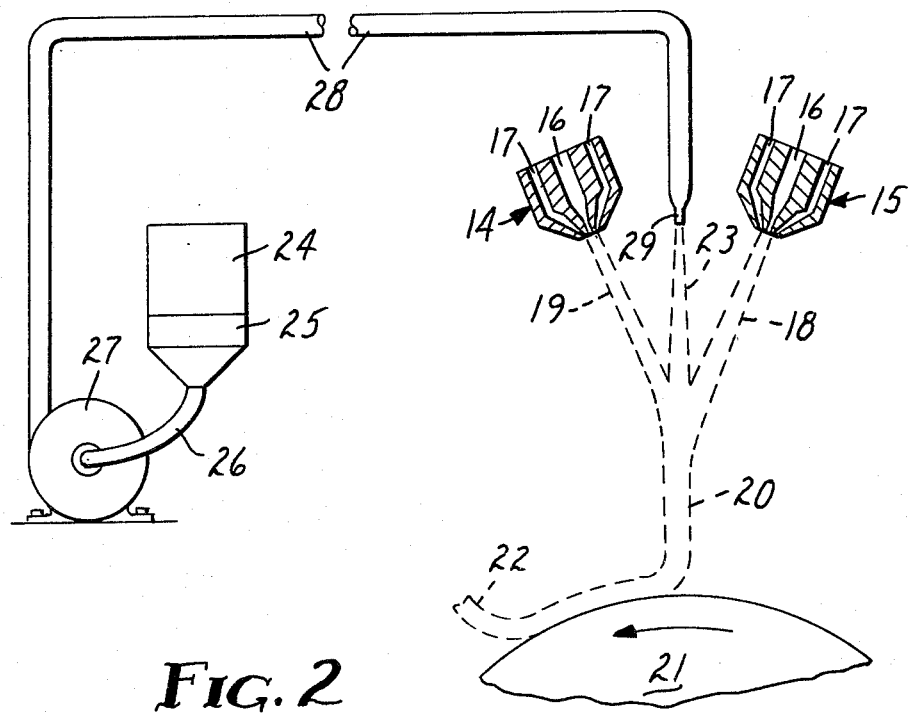
FIG. 2 is a schematic diagram of apparatus used in preparing a particle-filled melt-down fiber web useful in the present invention.

A representative apparatus useful for preparing a melt-blown fiber web for use in sheet material of the invention is shown schematically in FIG. 2. The apparatus is generally similar to that taught in U.S. Pat. No. 3,971,373 for preparing a particle-loaded web of melt-blown fibers. Part of the apparatus for forming melt-blown fibers is described in Wente, Van A., "Superfine Thermoplastic Fibers" in *Industrial Engineering Chemistry*, Vol., 48, p. 1342 et seq. (1956), or in Report No. 4364 of the Naval Research Laboratories, published May 25, 1954, entitled "Manufacture of Superfine Organic Fibers," by Wente, V. A.; Boone, C. D.; and Fluharty, E. L. The illustrated apparatus includes two dies 14 and 15 which include a set of aligned parallel die orifices 16 through which the molten polymer is extruded, and cooperating air orifices 17 through which heated air is forced at a very high velocity. The air draws out and attenuates the extruded polymeric material, and after a short travel in the gaseous stream, the extruded material solidifies as a mass of fibers. According to the present invention, two dies are preferably used and arranged so that the streams 18 and 19 of fibers issuing from them intersect to form one stream 20 that continues to a collector 21. The latter may take the form of a finely perforated cylindrical screen or drum, or a moving belt. The collected web 22 of microfibers is then removed from the collector and wound in a storage roll. Gas-withdrawal apparatus may be positioned behind the collector to assist in deposition of fibers and removal of gas.

The apparatus shown in FIG. 2 also includes apparatus for introducing vapor-sorptive particles into the sheet product of the invention. Desirably this apparatus introduces a stream 23 of the vapor-sorptive particles 12a which intercepts the two streams of melt-blown fibers at the latter's point of intersection. Such an arrangement is believed to be capable of providing a maximum loading of particles into the collected fibrous web. Alternatively a single die may be used with one or more particle streams arranged to intersect the stream of fibers issuing from the die. The streams of fibers and vapor-sorptive particles may travel in vertical paths as shown in FIG. 2 so as to generally parallel the force of gravity, or they may travel horizontally.

In the representative apparatus illustrated in FIG. 2, the apparatus for feeding vapor-sorptive particles into the stream of fibers comprises a hopper 24 for storing the particles; a metering device 25, such as a magnetic valve or metering device described in U.S. Pat. No. 3,661,302, which meters particles into a conduit 26 at a pedetermined rate; an air impeller 27 which forces air through a second conduit 28 and which accordingly draws particles from the conduit 26 into the second conduit 28; and a nozzle 29 through which the particles are ejected as the particle stream 23. The nozzle 29 may be formed, for example, by flattening the end of a cylindrical tube to form a wide-mouthed thin orifice. The amount of particles in the particle stream 23 is controlled by the rate of air flow through the conduit 28 and by the rate of particles passed by the metering device 25.

The particles are preferably introduced into the fiber stream at a point where the fibers havve solidified sufficiently that the fibers will form only a point contact with the particles (as taught in U.S. Pat. No. 3,971,373). However, the particles can be mixed with the fibers under conditions that will produce an area contact with the particles.

Once the vapor-sorptive particles have been intercepted in the fiber stream, a process for making a sheet product of the invention is generally the same as the process for making other blown fiber webs; and the collectors, methods of collecting, and methods of handling collected webs are generally the same as those for making non-particle-loaded blown fiber webs.

As collected, the melt-blown fiber web is generally thicker then it will be in the final completed product. Compression of the melt-blown fiber web appears to reduce insulation properties of the web, which is desirable to minimize heat stress on a person wearing a garment of the sheet material. As collected, the blown fiber web may be as thick as 5 millimeters or more, but in the completed sheet material it is desirably less than 2 millimeters thick, and more desirably less than 1 millimeter thick. In the completed sheet material the insulation value contributed by the fibrous web is generally less than 0.4 clo, and preferably less than 0.2 clo; preferably the complete sheet material is also less than those values. (Measurements are made by a guarded-plate test, ASTMD-1518; a constant that varies with the particular test apparatus is substracted from the measured value to obtain a "corrected" or "intrinsic" insulation value, which is the value reported herein; also insulation values are separately measured for the complete sheet material and for an assembly comprising only the support fabrics, and the latter value is subtracted from the first to obtain the contribution made by the fibrous web.) Despite the compression of the fibrous web in preferred completed products the vapor capacity of the web is not greatly reduced.

Other fibers besides blown fibers may be introduced into the sheet product in the manner taught in U.S. Pat. No. 4,118,531. For example, fibers of increased flame-resistance or of higher tensile strength may be mixed with blown fibers together with vapor-sorptive particles.

The blown fibers are preferably microfibers, averaging less than about 10 micrometers in diameter, since such fibers offer more points of contact with the particles per unit volume of fiber. Very small fibers, averaging less than 5 or even 1 micrometer in diameter, may be used, especially with vapor-sorptive particles of very small size. Larger fibers, e.g., averaging 25 micrometers or more in diameter, may also be prepared.

Blown fibrous webs are characterized by an extreme entanglement of the fibers, which provides coherency and strength to a web and also adapts the web to contain and retain particulate matter. The aspect ratio (ratio of length to diameter) of blown fibers approaches infinity, though the fibers have been reported to be discontinuous. The fibers are long and entangled sufficiently that it is generally impossible to remove one complete fiber from the mass of fibers or to trace one fiber from beginning to end.

The fibers may be formed from a wide variety of fiber-forming materials. Representative polymers of forming melt-blown fibers include polypropylene, polyethylene, polyethylene terephthalate, and polyamides. Inorganic materials also form useful fibers. Fibers of different fiber-forming materials may be used in the same sheet product in some embodiments of the invention, either in mixture in one layer or in different layers.

Many of the fiber-forming materials form hydrophobic fibers, which can be desirable to give the sheet material added resistance to water-borne toxic agents, or to water contaminated with toxic agents.

The vapor-sorptive particles used in the invention are usually an activated carbon, and the carbon is generally sufficiently activated so that it sorbs carbon tetrachloride in an amount of at least 40 percent of its weight. However, other vapor-sorptive particles may also be used, such as alumina, silica gel, porous polymer particles based on phenylene oxide ("Tenax" particles supplied by Enka N.V.) or carbonaceous absorbents based on polystyrene ("Ambersorb" particles supplied by Rohm and Haas). The vapor-sorptive particles may vary in size, at least from 5 to 2000 micrometers in average diameter.

The volume of vapor-sorptive particles included in a sheet product of the invention will depend on the particular use to be made of the product and will involve balancing the amount of sorption desired with properties such as integrity or strength of the web, or desired web thickness. To provide minimum levels of sorption efficiency, carbon particles are generally included in an amount of at least 15 grams per square meter area of the sheet material; but to provide longer lasting sorption, at least 50, and preferably at least 100 grams of carbon particles are used per square meter. Other vapor-sorptive particles will be used in generally similar amounts, though the weight amount may vary with the specific gravity of the particular particles.

So that the fibrous web does not become too thick, the particles generally account for at least 20, and preferably at least 50, volume-percent of the solid content of the sheet product ("solid content" is used to contrast with bulk volume and refers to the physical components of the sheet product and not the voids or interstices between those components). An advantage of the invention is that large amounts, even 75, 90 or more volume-percent, of carbon or other vapor-sorptive particles may be included to provide large amounts of particles per unit area of sheet material while still achieving a thin low-insulation permeable product.

A variety of permeable support fabrics can be used in sheet material of the invention depending upon the particular use to be made of the sheet material. Either woven or non-woven fabrics may be used, as may permeable sheets such as sold under the "Tyvek" trademark (and such permeable sheets are regarded as "fabrics" herein). Tightly woven fabrics provide the best water repellency, and water repellents may be added or coated onto the fabric or fibers in the fabric to increase water repellency. Also a film such as a microporous polytetrafluoroethylene or polyolefin membrane may be adhered to the fabric. Liquid repellent fabrics (such as available, for example, as "Gore-Tex" fabric provided by W. L. Gore and Associates or "Celgard" fabric provided by Celanese) allow provision of a low-insulation, vapor-sorptive sheet material which also serves as a liquid barrier and thus offers added protection against toxic agents, but nevertheless also allow escape of moisture vapor. Liquid barrier fabrics may be used on both sides of fibrous webs, and on the inner side can prevent body sweat from reducing the efficacy of the activated carbon.

The fabric typically contributes a majority of the resistance to air permeability for the complete sheet material, and the fabric should be selected to provide the required degree of permeability. For most uses of a garment, the sheet material should have an air permeability of at least one cubic foot per minute per square foot of sheet material as measured by Test Method 5450 in Federal Test Method Standard 191A, but for certain applications which require liquid barriers, less permeability is acceptable.

For most garment uses, the fabric that will serve as the outer fabric of the sheet material is more durable than the inner fabric, e.g., through the use of heavier weight fabrics, stronger fibers, etc. Natural or synthetic fiber materials may be used, and the fibers may be organic or inorganic. Fabrics made from flame-resistant fibers such as aramid fibers, or fibers treated with a flame-retarding agent may be used.

Fabrics are generally laminated to the inner side of the melt-down fiber web as well as the outer side to provide protection for the web and also to assure that particles are retained within the sheet material. However, the sheet material may be supplied with fabric on only one side, and the other side may be covered with a removable liner. More than one layer of fabric may be applied to one side of sheet material of the invention, as when a thinner, less expensive layer is first applied and a more expensive fabric is later attached to adapt the sheet material to a particular use. The fabric is preferably adhered to the web with an adhesive applied in a discontinuous manner, e.g., by use of spray adhesives which apply scattered droplets, or by printing in a pattern, to preserve permeability. The fabrics can also be sewn to the fibrous web or attached to the web by ultrasonic welding. In ultrasonic bonding techniques, an outer fabric, melt-blown fiber web and inner fabric can be welded together at spaced points or lines to give the sheet material added integrity. The various attachment methods may also be used in combination with one another.

For use in garments at least one of the support fabrics should have a grab strength as measured by Test Method No. 5100 in the Federal Test Method Standard No. 191A of at least 100 kilograms per centimeter of thickness. Preferably, at least one of the support fabrics has a strength of at least about 500 kilograms per centimeter of thickness. The sheet material is typically used to form all or substantially all of a garment, i.e., wearing apparel that is used to cover a substantial part of the human body (as distinguished, for example, from a face mask, which covers only a portion of the face of a wearer of the mask).

The sandwich of fabric and melt-blown fiber web is typically passed between pressure rolls to provide adhesion and also to compress the melt-blown fiber web. To obtain the best compression, the rolls should be heated, though some compression is also obtained when the rolls are at room temperature.

The invention will be further illustrated by the following example.

Equipment as shown in FIG. 2 of the drawings was used to prepare a web of melt-blown polypropylene microfibers loaded with particles of activated carbon. The microfibers and carbon particles ranged respectively between about 0.5 and 5 micrometers and between about 100 and 300 micrometers in diameter. The fibers in the web weighed about 18 grams per square meter, and the complete particle-loaded web weighed about 145 grams per square meter. The carbon had a static carbon tetrachloride capacity of at least 40%.

Two fabrics were spray-coated on one side with droplets of adhesive (3M Brand Spray Adhesive 77) in an amount of about 8 grams per square meter on each fabric. One of the fabrics, adapted to serve as the outer fabric in a garment, was a water repellent 50/50 nylon-cotton twill having a weight of 160 grams per square meter (available from Gibraltar Industries and meeting the requirements of military specification MIL-C-43892). The other fabric, adapted to serve as the inner fabric or liner, was a nylon tricot knit fabric having a nominal weight of 64 grams per square meter (available from Engineered Fabrics Incorporated, Style 532; this fabric meets military specification MIL-C-43858(GL)).

After the sprayed adhesive had dried, the carbon-loaded microfiber web was assembled between the adhesive-coated sides of the two fabrics, and the assembly was passed through a nip roll heated to about 200°–220° F. The adhesive softened and penetrated into the large-surface edges of the melt-blown web, and upon cooling of the assembly, a laminate was formed that was about 50 mils (1.25 millimeters) thick and weighed about 400 grams per square meter.

The vapor capacity of the laminate was measured by a test similar to that described in military specification MIL-C-43858(GL) was found to be 1.9 milligrams of carbon tetrachloride/square centimeter. The thermal transmittance through the laminate was also measured by the guarded hot plate test (ASTM D-1518) and found to be 0.16 clo. The thermal transmittance of the nylon-cotton twill measured by itself was found to be 0.11 clo.

What is claimed is:

1. Reduced-stress vapor-sorbing garment having as one component sheet material which comprises a permeable support fabric and, attached to the permeable support fabric, a fibrous web which exhibits an insulation value of less than about 0.4 clo and which comprises a coherent mass of melt-blown organic polymeric fibers and vapor-sorptive particles uniformly dispersed in the mass of fibers in an amount of at least 15 grams per square meter area of the sheet material.

2. A garment of claim 1 in which said permeable support fabric and fibrous web are adhered together by a discontinuous adhesive layer disposed between them.

3. A garment of claim 2 in which said permeable support fabric and fibrous web are further attached together by ultrasonic welding.

4. A garment of claim 1 in which said permeable support fabric and fibrous web are attached together by ultrasonic welding.

5. a garment of claim 1 in which the particles comprise activated carbon.

6. A garment of claim 1 in which the melt-blown fibers comprise polypropylene.

7. A garment of claim 1 in which the vapor-sorptive particles comprise at least about 20 volume-percent of the fibrous web.

8. A garment of claim 1 in which the permeable support fabric carries a water-repelling treatment.

9. A garment of claim 8 in which the water repelling treatment comprises a microporous membrane adhered to the fabric.

10. A garment of claim 1 in which a permeable fabric is attached to both sides of the fibrous web.

11. A garment of any of claims 1, 2, 3, 4, 5, 6, 7, 8, 9 or 10 in which the fibrous web has a thickness of less than about 2 millimeters.

12. Reduced-stress vapor-sorbing garment having as one component sheet material which comprises first and second permeable support fabrics, and attached between the permeable support fabrics, a fibrous web which exhibits an insulation value of less than 0.4 clo and which comprises a coherent mass less than 2 millimeters in thickness of melt-blown organic polymeric fibers containing activated carbon particles uniformly dispersed in the mass of fibers in an amount of at least 50 grams per square meter area of the sheet material and in an amount accounting for at least about 50 volume-percent of the fibrous web.

13. A garment of claim 12 in which said support fabrics and fibrous web are adhered together by adhesive layers disposed between them.

14. A garment of claim 13 in which said support fabrics and fibrous web are further attached together by ultrasonic welding.

15. A garment of claim 12 in which at least one of said support fabrics and the fibrous web are attached together by ultrasonic welding.

16. A garment of claim 12 in which the particles comprise activated carbon.

17. A garment of claim 12 in which the melt-blown fibers comprise polypropylene.

18. A garment of claim 12 in which the first permeable fabric is a woven fabric.

19. A garment of claim 12 in which at least one of the permeable support fabrics carries a water-repelling treatment.

20. A garment of claim 19 in which the water-repelling treatment comprises a microporous membrane adhered to the fabric.

21. Vapor-sorbing particle-containing sheet material adapted for use in a reduced-stress vapor-sorbing garment, said sheet material comprising a permeable support fabric having a grab strength of at least 500 kilograms/centimeter of thickness and, attached to the permeable support fabric, a fibrous web which exhibits an insulation value of less than about 0.4 clo and which comprises a coherent mass of melt-blown organic polymeric fibers and vapor-sorptive particles uniformly dispersed in the mass of fibers in an amount of at least 15 grams per square meter of the sheet material.

22. Sheet material of claim 21 in which said permeable support fabric and fibrous web are adhered together by a discontinuous adhesive layer disposed between them.

23. Sheet material of claim 22 in which said permeable support fabric and fibrous web are further attached together by ultrasonic welding.

24. Sheet material of claim 21 in which said permeable support fabric and fibrous web are attached together by ultrasonic welding.

25. Sheet material of claim 21 in which the particles comprise activated carbon.

26. Sheet material of claim 21 in which the melt-blown fibers comprise polypropylene.

27. Sheet material of claim 21 in which the vapor-sorptive particles comprise at least about 20 volume-percent of the fibrous web.

28. Sheet material of claim 21 in which the permeable support fabric carries a water-repelling treatment.

29. Sheet material of claim 28 in which the water repelling treatment comprises a microporous membrane adhered to the fabric.

30. Sheet material of claim 21 in which a permeable fabric is attached to both sides of the fibrous web.

31. Sheet material of claim 21 which has an insulation value of less than about 0.2 clo.

32. Vapor-sorbing particle-containing sheet material adapted for use in a reduced-stress vapor-sorbing garment, said sheet material comprising first and second permeable support fabrics at least one of which has a grab strength of at least 500 kilograms/centimeter of thickness and, attached to the permeable support fabric, a fibrous web which exhibits an insulation value of less than about 0.2 clo and which comprises a coherent mass of melt-blown organic polymeric fibers and vapor-sorptive particles uniformly dispersed in the mass of fibers in an amount of at least 50 grams per square meter of the sheet material and in an amount accounting for at least 50 volume-percent of the fibrous web.

33. Sheet material of claim 32 in which said permeable support fabric and fibrous web are adhered together by a discontinuous adhesive layer disposed between them.

34. Sheet material of claim 33 in which said permeable support fabric and fibrous web are further attached together by ultrasonic welding.

35. Sheet material of claim 32 in which said permeable support fabric and fibrous web are attached together by ultrasonic welding.

36. Sheet material of claim 32 in which the melt-blown fibers comprise polypropylene.

37. Sheet material of claim 32 in which the permeable support fabric carries a water-repelling treatment.

38. Sheet material of claim 37 in which the water repelling treatment comprises a microporous membrane adhered to the fabric.

* * * * *